United States Patent
Dandalides et al.

(10) Patent No.: US 9,061,583 B2
(45) Date of Patent: Jun. 23, 2015

(54) REAR INTEGRATION OF A SUSPENSION SYSTEM AND FUEL TANKS IN FUEL CELL VEHICLES

(71) Applicant: GM Global Technology Operations LLC, Detroit, MI (US)

(72) Inventors: James W. Dandalides, Macomb, MI (US); David A. Young, Huntington Woods, MI (US); Robert Metzenmacher, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/068,035

(22) Filed: Oct. 31, 2013

(65) Prior Publication Data

US 2014/0054296 A1   Feb. 27, 2014

Related U.S. Application Data

(60) Division of application No. 13/672,866, filed on Nov. 9, 2012, now Pat. No. 8,864,175, which is a continuation of application No. 12/198,985, filed on Aug. 27, 2008, now Pat. No. 8,465,057.

(51) Int. Cl.
| | |
|---|---|
| *B60G 11/04* | (2006.01) |
| *B60K 15/063* | (2006.01) |
| *B60G 7/02* | (2006.01) |
| *B60G 15/06* | (2006.01) |
| *B60K 15/07* | (2006.01) |
| *B60K 15/077* | (2006.01) |
| *B62D 21/11* | (2006.01) |
| *B60K 15/03* | (2006.01) |

(52) U.S. Cl.
CPC .............. *B60K 15/063* (2013.01); *B60G 7/02* (2013.01); *B60G 11/04* (2013.01); *B60G 15/067* (2013.01); *B60G 2204/121* (2013.01); *B60G 2204/143* (2013.01); *B60G 2206/606* (2013.01); *B60G 2300/50* (2013.01); *B60K 15/07* (2013.01); *B60K 2015/03118* (2013.01); *B60K 15/03006* (2013.01); *B60K 15/077* (2013.01); *B60K 2015/0634* (2013.01); *B60K 2015/0636* (2013.01); *B60K 2015/0638* (2013.01); *B62D 21/11* (2013.01)

(58) Field of Classification Search
USPC .......... 280/830, 831, 832, 834, 837, 838, 389
See application file for complete search history.

(56) References Cited

U.S. PATENT DOCUMENTS

| | | | | |
|---|---|---|---|---|
| 2,122,656 | A | * | 7/1938 | Paget ......................... 137/899.4 |
| 4,325,560 | A | * | 4/1982 | Hirvonen ...................... 280/838 |

(Continued)

FOREIGN PATENT DOCUMENTS

| | | |
|---|---|---|
| CN | 1910066 A | 2/2007 |
| DE | 10239500 A1 | 9/2003 |

(Continued)

*Primary Examiner* — Kevin Hurley
(74) *Attorney, Agent, or Firm* — Fraser Clemens Martin & Miller LLC; James D. Miller (57) ABSTRACT

A fuel cell powered vehicle fuel storage system is disclosed having a suspension system, a fuel tank, and a support system, wherein the suspension system, fuel tank, and support system cooperate to carry vehicle structural loads and the reaction loads of the suspension system and to maximize a volume of the fuel tank.

16 Claims, 4 Drawing Sheets

(56) References Cited

U.S. PATENT DOCUMENTS

| | | | |
|---|---|---|---|
| 5,547,224 A * | 8/1996 | Kami et al. | 280/834 |
| 5,560,651 A * | 10/1996 | Kami et al. | 280/788 |
| 5,890,740 A * | 4/1999 | Kami | 280/834 |
| 6,086,103 A * | 7/2000 | Fukagawa et al. | 280/830 |
| 7,063,355 B2 * | 6/2006 | Hashimura | 280/830 |
| 7,198,301 B2 * | 4/2007 | Wozniak et al. | 280/830 |
| 7,422,242 B2 * | 9/2008 | Matsumoto et al. | 280/834 |
| 7,614,473 B2 * | 11/2009 | Ono et al. | 180/299 |
| 7,829,240 B2 * | 11/2010 | Young et al. | 429/515 |
| 8,286,980 B2 * | 10/2012 | Onda et al. | 280/124.128 |
| 2004/0108677 A1 * | 6/2004 | Sekiguchi | 280/124.109 |
| 2007/0246929 A1 * | 10/2007 | Isayama et al. | 280/834 |

FOREIGN PATENT DOCUMENTS

| | | |
|---|---|---|
| DE | 202004000096 U1 | 6/2005 |
| DE | 102007046059 A1 | 4/2008 |
| JP | 2004291934 A * 10/2004 | B62D 25/20 |

* cited by examiner

REAR INTEGRATION OF A SUSPENSION SYSTEM AND FUEL TANKS IN FUEL CELL VEHICLES

CROSS-REFERENCE TO RELATED APPLICATION

This application is a divisional application of and claims the benefit of priority of U.S. patent application Ser. No. 13/672,866 filed on Aug. 27, 2008, hereby incorporated herein by reference in its entirety, which is a continuation application of and claims the benefit of priority of U.S. patent application Ser. No. 12/198,985.

FIELD OF THE INVENTION

The invention relates to a fuel cell powered vehicle and more particularly to a fuel cell powered vehicle fuel storage system having a suspension system, a fuel tank, and a support system which cooperate to carry vehicle structural loads and reaction loads of the suspension system, and maximize a volume of the fuel tank.

BACKGROUND OF THE INVENTION

Typical fuel cell powered vehicles use fuel cell power systems that convert a fuel and an oxidant into electricity. One type of fuel cell power system employs use of a proton exchange membrane (hereinafter "PEM") to catalytically facilitate reaction of fuels (such as hydrogen) and oxidants (such as air or oxygen) into electricity. The fuel is typically stored in large pressurized fuel tanks and stored on an undercarriage of the vehicle.

Fuel cell powered vehicles, like conventional powered vehicles, have suspension systems designed to cooperate with the vehicle handling and braking systems and keep the vehicle substantially isolated from road noise, bumps, and vibrations. Typically, the vehicle will have a suspension system affiliated with the tires disposed adjacent to the fuel tanks. The large size and shape of the fuel tank often restricts the function of the vehicle suspension system and limits the suspension linkage shape and suspension configuration. Space for the fuel tank is usually limited to a space beneath a floorpan of the vehicle and adjacent the second row of seats. Due to space constraints created by the suspension system and the fuel tanks, interior passenger space or cargo space may be reduced to provide a fuel tank capable of storing enough fuel to meet vehicle performance requirements.

It would be desirable to develop a fuel cell powered vehicle incorporating a storage system including a suspension system, a fuel tank, and a support system adapted to cooperate to carry vehicle structural loads and reaction loads of a suspension system and maximize a volume of the fuel tank to maximize fuel storage capacity.

SUMMARY OF THE INVENTION

Concordant and congruous with the present invention, a storage system for a fuel cell powered vehicle adapted to cooperate to carry vehicle structural loads and reaction loads of a suspension system and maximize a volume of the fuel tank to maximize a fuel storage capacity has surprisingly been discovered.

In one embodiment, a fuel storage system for a vehicle comprises a support system adapted to be coupled to the vehicle; a first fuel tank for storing a compressed fuel coupled to the support system; and a suspension system coupled to the first fuel tank, wherein the suspension system, the support system, and the first fuel tank cooperate to carry vehicle structural loads and reaction loads.

In another embodiment, a fuel storage system for a vehicle comprises a first fuel tank for storing a compressed fuel; a support system coupled to the first fuel tank and adapted to be coupled to the vehicle; and a suspension system coupled to the support system, the suspension system including at least one spring, wherein the suspension system and the fuel tank cooperate to carry vehicle structural loads and reaction loads.

In another embodiment, a fuel storage system for a vehicle comprises a support system adapted to be coupled to the vehicle; at least two fuel tanks for storing a compressed fuel coupled to the support system; and a suspension system coupled to the fuel tanks, wherein the suspension system, the support system, and the fuel tanks cooperate to carry vehicle structural loads and reaction loads.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
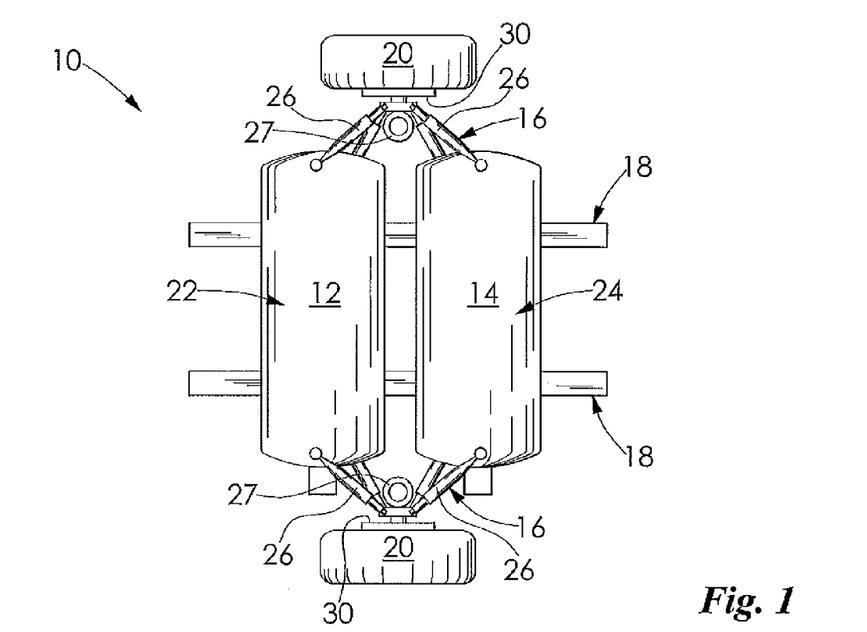
FIG. 1 is a top plan view of a suspension system of a vehicle incorporating a fuel storage system according to an embodiment of the invention.

FIG. 1 shows a fuel storage system 10 according to an embodiment of the invention. The fuel storage system 10 includes a first fuel tank 12, a second fuel tank 14, a suspension system 16, and a support system 18. More or fewer tanks may be used as desired. In the embodiment shown, the fuel tanks 12, 14 of the fuel storage system 10 are disposed on an undercarriage of a fuel cell powered vehicle (not shown) and intermediate tires 20 of the vehicle. It is understood that the fuel storage system 10 may be disposed on other vehicles and on other portions of the vehicle, as desired.

The first fuel tank 12 and the second fuel tank 14 are coupled to the suspension system 16. The fuel tanks 12, 14 are in fluid communication with a fuel cell assembly (not shown) to provide a fuel (not shown) to the fuel cell assembly to power the vehicle. In the embodiment shown in FIG. 1, the first fuel tank 12 and the second fuel tank 14 have substantially the same shape and dimensions. However, different shapes and dimensions may be used, as desired. Outer walls 22, 24 of the respective fuel tanks 12, 14 form a cavity adapted to store the fuel. In the embodiment shown, the first fuel tank 12 and the second fuel tank 14 are disposed substantially perpendicular to a longitudinal axis of the vehicle. However, it is understood that the fuel tanks 12, 14 may be oriented otherwise such as parallel to the longitudinal axis of the vehicle, for example. The fuel tanks 12, 14 have a substantially circular cross-sectional shape, although other cross-sectional shapes may be used. It is further understood that the outer walls 22, 24 may be formed from any conventional material with mechanical properties sufficient to store a compressed fuel. The outer walls 22, 24 may be formed from a metal, a plastic, a composite material, and other conventional materials, as desired. The fuel may be a liquid or a compressed gas, such as hydrogen, oxygen, nitrogen, or air for example.

The suspension system 16 includes a plurality of control arms 26 and a plurality of springs 27. The control arms 26 are pivotally coupled to the first fuel tank 12 and the second fuel tank 14, and a wheel assembly 30. As shown in FIG. 1, the wheel assembly 30 is a spindle, also known as a knuckle. The springs 27 are coupled to the wheel assembly 30 and a portion of the vehicle. The pivotal connections facilitate relative movement between the wheel assembly 30 and the fuel tanks 12, 14. It is understood that the suspension system 16 may include conventional shock absorbers such as a pneumatic shock absorber or a hydraulic shock absorber, for example.

In the embodiment shown, the support system 18 is a plurality of spaced apart vehicle frame rails. The support system 18 forms a part of the structure of the vehicle with the first fuel tank 12 and the second fuel tank 14. It is understood that the fuel tanks 12, 14 may be integrally formed with the support system 18 or separately formed and attached to the support system 18, as desired.

In use, the fuel storage system 10 is coupled to the undercarriage of the vehicle. It is understood that the fuel storage system 10 may be separately assembled and attached to the vehicle, if desired. When the vehicle is driven, the control arms 26 of the suspension system 16 minimize the movement of the vehicle and passengers caused by road irregularities such as debris, potholes, and uneven roads, for example. The springs 27 and control arms 26 are adapted to dampen a sudden shock impulse and dissipate the kinetic energy generated as the vehicle is driven. Because the control arms 26 and the support system 18 are coupled to the fuel tanks 12, 14, the fuel tanks 12, 14 are a load bearing member of the vehicle, and function as the support frame of the vehicle. Therefore, the size, shape, weight, and other design considerations of the fuel tanks 12, 14 are adapted to handle the vehicle loads. In the embodiment shown, the fuel tanks 12, 14 are adapted to carry vehicle structural loads and the reaction loads of the suspension system 16.

Interference with the performance of the suspension system 16 by the fuel tanks 12, 14 is militated against because the fuel tanks 12, 14 are coupled directly to the suspension system 16 and the support system 18. The direct coupling minimizes a redundancy of support member components, suspension system 16 components, and other vehicle components. Further, by minimizing the combined space occupied by the suspension system 16, the support system 18, and the fuel storage system 10, the storage volume of the fuel tanks 12, 14 may be maximized. A further advantage of providing the fuel storage system 10 that minimizes the redundancy of suspension system 16 components is that the interior and cargo space of the vehicle typically removed to provide for larger volumes of fuel storage in the fuel tanks 12, 14 is minimized. Accordingly, the utility and comfort of the vehicle are optimized.

Figure 2:
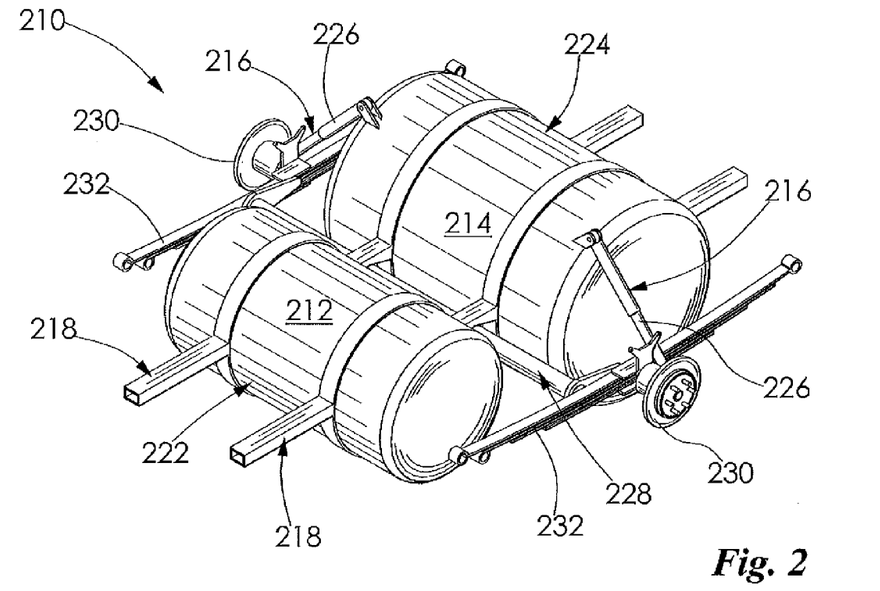
FIG. 2 is a top perspective view of a suspension system of a vehicle incorporating a fuel storage system according to another embodiment of the invention.

FIG. 2 shows a fuel storage system 210 according to another embodiment of the invention. The fuel storage system 210 includes a first fuel tank 212, a second fuel tank 214, a suspension system 216, and a support system 218. More or fewer tanks may be used as desired. In the embodiment shown, the fuel tanks 212, 214 of the fuel storage system 210 are disposed on an undercarriage of a fuel cell powered vehicle (not shown) and intermediate the wheel assemblies 230 and tires of the vehicle. It is understood that the fuel storage system 210 may be disposed on other vehicles and on other portions of the vehicle, as desired.

The first fuel tank 212 and the second fuel tank 214 are coupled to the suspension system 216. The fuel tanks 212, 214 are in fluid communication with a fuel cell assembly (not shown) to provide a fuel (not shown) to the fuel cell assembly to power the vehicle. In the embodiment shown in FIG. 2, the first fuel tank 212 and the second fuel tank 214 have the same shape but different dimensions. However, different shapes and dimensions may be used, as desired. Outer walls 222, 224 of the respective fuel tanks 212, 214 form a cavity adapted to store the fuel. In the embodiment shown, the first fuel tank 212 and the second fuel tank 214 are disposed substantially perpendicular to a longitudinal axis of the vehicle. However, it is understood that the fuel tanks 212, 214 may be oriented otherwise such as parallel to the longitudinal axis of the vehicle, for example. The fuel tanks 212, 214 have a substantially circular cross-sectional shape, although other cross-sectional shapes may be used. It is further understood that the outer walls 222, 224 may be formed from any conventional material with mechanical properties sufficient to store a compressed fuel. The outer walls 222, 224 may be formed from a metal, a plastic, a composite material, and other conventional materials, as desired The fuel may be a liquid or a compressed gas, such as hydrogen, oxygen, nitrogen, or air, for example The suspension system 216 includes a plurality of control arms 226 and a plurality of leaf springs 232. The leaf springs 232 are pivotally coupled to a frame of the vehicle (not shown) and to the control arms 226. The control arms 226 are pivotally coupled to the leaf springs 232, and the first fuel tank 212 and the second fuel tank 214. Ends of the leaf springs 232 are pivotally connected to the frame to facilitate relative movement between the axle 228 and the fuel tanks 212, 214. A wheel assembly 230 is disposed on each end of the axle 228. The control arms 226 may be any conventional shock absorbers such as a pneumatic shock absorber or a hydraulic shock absorber, for example. It is understood that the leaf springs 232 may be any conventional control arms such as A-arm or wishbone control arms, for example. It is also understood that any number of leaf springs 232 may be used with the suspension system 216, as desired.

In the embodiment shown, the support system 218 is a plurality of spaced apart vehicle frame rails. The support system 218 forms a part of the structure of the vehicle with the first fuel tank 212 and the second fuel tank 214. It is understood that the fuel tanks 212, 214 may be integrally formed with the support system 218 or separately formed and attached to the support system 218, as desired.

In use, the fuel storage system 210 is coupled to the undercarriage of the vehicle. It is understood that the fuel storage system 210 may be separately assembled and attached to the vehicle, if desired. When the vehicle is driven, the control arms 226 and the leaf springs 232 minimize the movement of the vehicle and passengers caused by road irregularities such as debris, potholes, and uneven roads, for example. The control arms 226 and the leaf springs 232 are adapted to dampen a sudden shock impulse and dissipate the kinetic energy generated as the vehicle is driven. Because the control arms 226 are coupled to the fuel tanks 212, 214, the fuel tanks 212, 214 are a load bearing member of the vehicle, and function as part of the support frame of the vehicle. The size, shape, weight, and other design considerations of the fuel tanks 212, 214 are adapted to handle vehicle loads. In the embodiment shown, the fuel tanks 212, 214 are adapted to carry vehicle structural loads and the reaction loads of the suspension system 216.

Interference with the performance of the suspension system 216 by the fuel tanks 212, 214 is militated against because the fuel tanks 212, 214 are coupled directly to the suspension system 216 and the support system 218. The direct coupling minimizes a redundancy of support member components, suspension system 216 components, and other vehicle components. Further, by minimizing the combined space occupied by the suspension system 216, the support system 218, and the fuel storage system 210, the storage volume of the fuel tanks 212, 214 may be maximized. A further advantage of providing the fuel storage system 210 that minimizes the redundancy of suspension system 216 components is that the interior and cargo space of the vehicle typically removed to provide for larger volumes of fuel storage in the fuel tanks 212, 214 is minimized. Accordingly, the utility and comfort of the vehicle are optimized.

Figure 3:
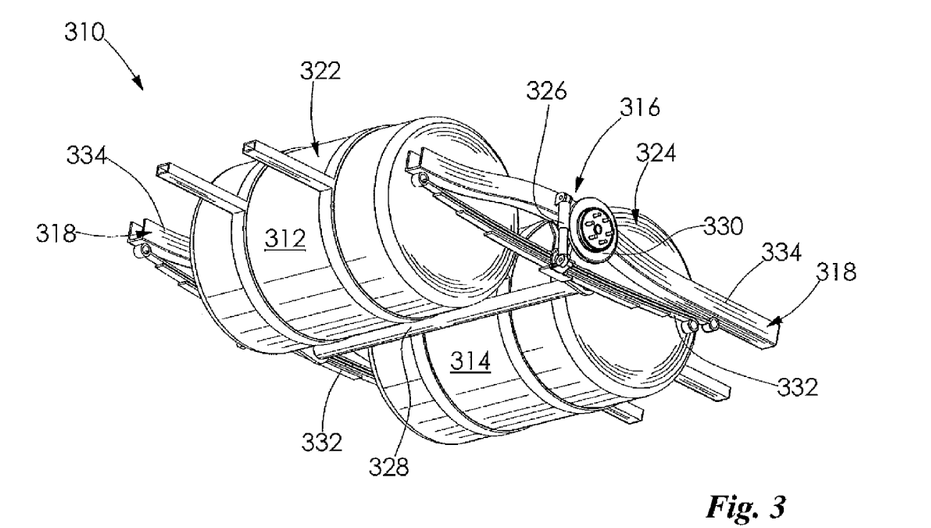
FIG. 3 is a bottom perspective view of a suspension system of a vehicle incorporating a fuel storage system according to another embodiment of the invention.

FIG. 3 shows a fuel storage system 310 according to another embodiment of the invention. The embodiment of FIG. 3 is similar to the fuel storage system 210 of FIG. 2 except as described below. Like the structure from FIG. 2, FIG. 3 includes reference numerals in the 300s instead of the 200s, with the remaining two digits the same.

In the embodiment shown, the suspension system 316 includes a plurality of control arms 326 and a plurality of leaf springs 332. The leaf springs 332 are pivotally coupled to a frame 334 of the vehicle and to the control arms 326. The control arms 326 are coupled to the leaf springs 332, and the frame 334 of the vehicle. The pivotal connections facilitate relative movement between an axle 328 and fuel tanks 312, 314. A wheel assembly 330 is disposed on each end of the axle 328. The control arms 326 may be any conventional shock absorbers such as a pneumatic shock absorber or a hydraulic shock absorber, for example. It is understood that the leaf springs 332 may be any conventional control arms such as A-arm or wishbone control arms, for example. It is also understood that any number of leaf springs 332 may be used with the suspension system 316, as desired.

In use, the fuel storage system 310 is coupled to the undercarriage of the vehicle. It is understood that the fuel storage system 310 may be separately assembled and attached to the vehicle, if desired. When the vehicle is driven, the control arms 326 and the leaf springs 332 minimize the movement of the vehicle and passengers caused by road irregularities such as debris, potholes, and uneven roads, for example. The control arms 326 and leaf springs 332 are adapted to dampen a sudden shock impulse and dissipate the kinetic energy generated as the vehicle is driven. Because the control arms 326 are coupled to the frame 334, the frame 334 is a load bearing member of the vehicle, and functions as part of the support frame of the vehicle. The size, shape, weight, and other design considerations of the frame 334 are adapted to handle vehicle loads.

Interference with the performance of the suspension system 316 by the fuel tanks 312, 314 is militated against because the fuel tanks 312, 214 are coupled directly to the suspension system 316 and the support system 318. The direct coupling minimizes a redundancy of support member components, suspension system 316 components, and other vehicle components. Further, by minimizing the combined space occupied by the suspension system 316, the support system 318, and the fuel storage system 310, the storage volume of the fuel tanks 312, 314 may be maximized. A further advantage of providing the fuel storage system 310 that minimizes the redundancy of suspension system 316 components is that the interior and cargo space of the vehicle typically removed to provide for larger volumes of fuel storage in the fuel tanks 312, 314 is minimized. Accordingly, the utility and comfort of the vehicle are optimized.

Figure 4:
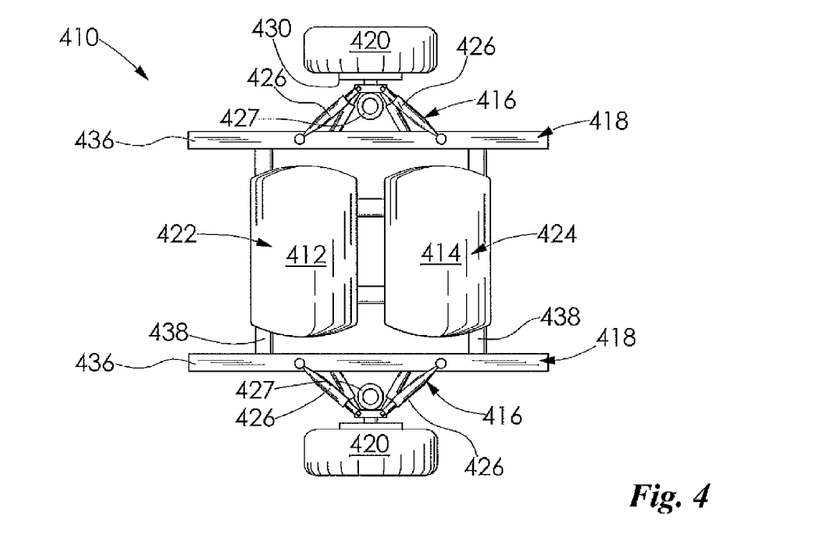
FIG. 4 is a top plan view of a suspension system of a vehicle incorporating a fuel storage system according to another embodiment of the invention.

FIG. 4 shows a fuel storage system 410 according to an embodiment of the invention. The fuel storage system 410 includes a first fuel tank 412, a second fuel tank 414, a suspension system 416, and a support system 418. More or fewer tanks may be used as desired. In the embodiment shown, the fuel tanks 412, 414 of the fuel storage system 410 are disposed on an undercarriage of a fuel cell powered vehicle (not shown) and intermediate the tires 420 of the vehicle. It is understood that the fuel storage system 410 may be disposed on any vehicle and on any portion of the vehicle, as desired.

The first fuel tank 412 and the second fuel tank 414 are coupled to the support system 418 perpendicular to a longitudinal axis of the vehicle. The fuel tanks 412, 414 are in fluid communication with a fuel cell assembly (not shown) to provide a fuel (not shown) to the assembly the power the vehicle. As shown in FIG. 4, the first fuel tank 412 and the second fuel tank 414 have substantially the same shape and dimensions. However, different shapes and dimensions may be used, as desired. Outer walls 422, 424 of the respective fuel tanks 412, 414 form a cavity adapted to store the fuel. In the embodiment shown, the first fuel tank 412 and the second fuel tank 414 are disposed substantially perpendicular to a longitudinal axis of the vehicle. However, it is understood that the fuel tanks 412, 414 may be disposed parallel to the longitudinal axis of the vehicle. The fuel tanks 412, 414 have a substantially circular cross-sectional shape, although other cross-sectional shapes may be used. It is further understood that the outer walls 422, 424 may be formed from any conventional material with mechanical properties sufficient to store a compressed fuel. The outer walls 422, 424 may be formed from a metal, a plastic, a composite material, and any other conventional materials, as desired. The fuel may be a liquid or a compressed gas, such as hydrogen oxygen, nitrogen, or air, for example.

The suspension system 416 includes a plurality of control arms 426 and a plurality of springs 427. The control arms 426 are pivotally coupled to the support system 418, and a wheel assembly 430. As shown in FIG. 4, the wheel assembly 430 is a spindle, also known as a knuckle. The springs 427 are coupled to the wheel assembly 430 and a portion of the vehicle. The pivotal connections facilitate relative movement between the wheel assembly 430 and the support system 418 with the fuel tanks 412, 414 coupled thereto. It is understood that the suspension system 416 may include conventional shock absorbers such as a pneumatic shock absorber or a hydraulic shock absorber, for example.

In the embodiment shown, the support system 418 is a subframe including a plurality of spaced apart rails 436. The rails 436 are disposed on an undercarriage of the vehicle parallel to the longitudinal axis of the vehicle. The support system 418 forms a part of the support frame of the vehicle and the support system 418 is coupled to the fuel tanks 412, 414 by cross rails 438. The fuel tanks 412, 414 are coupled together and fixed to the rails 436 of the subframe by the cross rails 438 to provide cross-support to the support system 418.

In use, the fuel storage system 410 is coupled to the undercarriage of the vehicle. It is understood that the fuel storage system 410 may be separately assembled and attached to the vehicle, if desired. When the vehicle is driven, the control arms 426 of the suspension system 416 minimize the movement of the vehicle and passengers caused by road irregularities such as debris, potholes, and uneven roads, for example. The springs 427 and control arms 426 are adapted to dampen a sudden shock impulse and dissipate the kinetic generated as the vehicle is driven. Because the control arms 426 are coupled to the rails 436 of the support system 418, the support system 418 and the fuel tanks 412, 414 are a load bearing member of the vehicle, and function as part of the support frame of the vehicle. The support system 418 and the fuel tanks 412, 414 cooperate to carry vehicle structural loads and the reaction loads of the suspension system 416.

Interference with the performance of the suspension system 416 by the fuel tanks 412, 414 is militated against because the fuel tanks 412, 414 are coupled to, and provide cross support for, the support system 418 which is coupled directly to the suspension system 416. The direct coupling minimizes a redundancy of support member components, suspension system 416 components. Further, by minimizing the combined space occupied by the suspension system 416, the support system 418, and the fuel storage system 410, the storage volume of the fuel tanks 412, 414 may be maximized. A further advantage of providing the fuel storage system 410 that minimizes the redundancy of suspension system 416 components is that the interior and cargo space of the vehicle typically removed to provide for large volumes of fuel storage in the fuel tanks 412, 414 is minimized. Accordingly, the utility and comfort of the vehicle are minimized.

Figure 5:
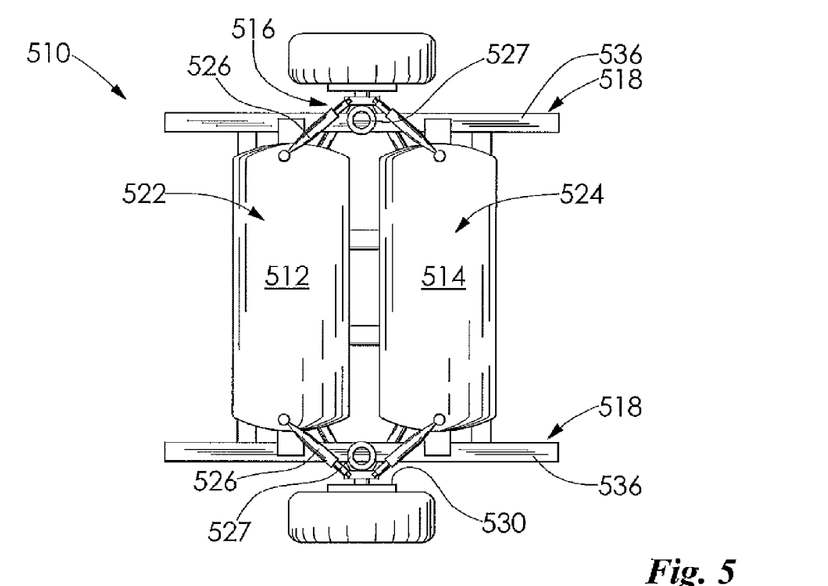
FIG. 5 is a top plan view of a suspension system of a vehicle incorporating a fuel storage system according to another embodiment of the invention.

FIG. 5 shows a fuel storage system 510 according to another embodiment of the invention. The embodiment of FIG. 5 is similar to the fuel storage system 410 of FIG. 4 except as described below. Like the structure from FIG. 4, FIG. 5 includes reference numerals in the 500s instead of the 400s, with the remaining two digits the same.

The suspension system 516 includes a plurality of control arms 526 and a plurality of springs 527. The control arms 526 are pivotally coupled to fuel tanks 512, 514 and a wheel assembly 530. As shown in FIG. 5, the wheel assembly 530 is a spindle, also known as a knuckle. The springs 527 are coupled to the wheel assembly 530 and a portion of the vehicle. The pivotal connections facilitate relative movement between the wheel assembly 530 and the support system 518 with the fuel tanks 512, 514 coupled thereto. It is understood that the suspension system 516 may include conventional shock absorbers such as a pneumatic shock absorber or a hydraulic shock absorber, for example.

In the embodiment shown, the support system 518 is a subframe including a plurality of spaced apart rails 536. The support system 518 is coupled to the frame of the vehicle and to the fuel tanks 512, 514. The rails 536 are disposed on an undercarriage of the vehicle parallel to the longitudinal axis of the vehicle. The fuel tanks 512, 514 are coupled directly to the rails 536 to provide cross-support to the support system 518.

In use, the fuel storage system 510 is coupled to the undercarriage of the vehicle. It is understood that the fuel storage system 510 may be separately assembled and attached to the vehicle, if desired. When the vehicle is driven, the control arms 526 of the suspension system 516 minimize the movement of the vehicle and passengers caused by road irregularities such as debris, potholes, and uneven roads, for example. The springs 527 and control arms 526 are adapted to dampen a sudden shock impulse and dissipate the kinetic generated as the vehicle is driven. Because the control arms 526 are coupled to the fuel tanks 512, 514, the fuel tanks 512, 514 are load bearing members of the vehicle, and function as part of the support frame of the vehicle. The support system 518 and the fuel tanks 512, 514 cooperate to carry vehicle structural loads and the reaction loads of the suspension system 516.

Interference with the performance of the suspension system 516 by the fuel tanks 512, 514 is militated against because the fuel tanks 512, 514 are coupled to, and provide cross support for, the support system 518 which is coupled directly to the suspension system 516. The direct coupling minimizes a redundancy of support member components, suspension system 516 components. Further, by minimizing the combined space occupied by the suspension system 516, the support system 518, and the fuel storage system 510 the storage volume of the fuel tanks 512, 514 may be maximized. A further advantage of providing the fuel storage system 510 that minimizes the redundancy of suspension system 516 components is that the interior and cargo space of the vehicle typically removed to provide for large volumes of fuel storage in the fuel tanks 512, 514 is minimized. Accordingly, the utility and comfort of the vehicle are optimized.

Figure 6:
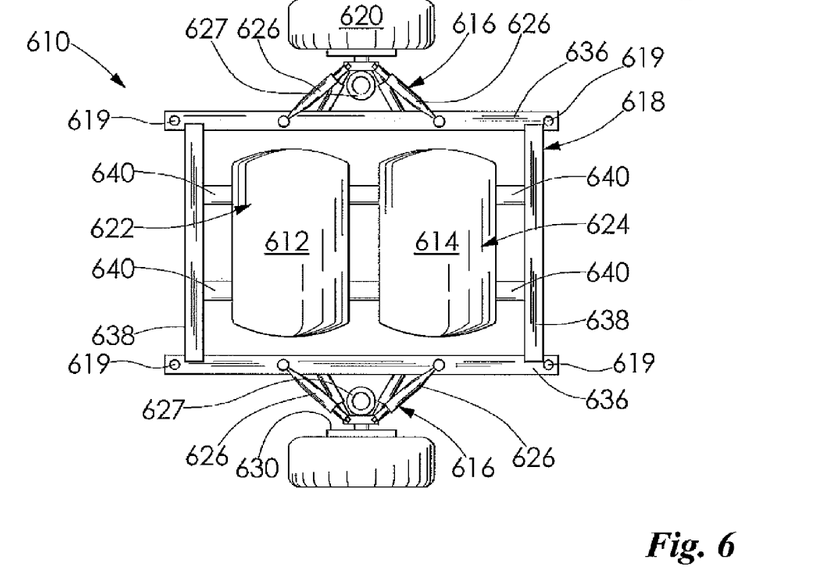
FIG. 6 is a top plan view of a suspension system of a vehicle incorporating a fuel storage system according to another embodiment of the invention.
Figure 7:
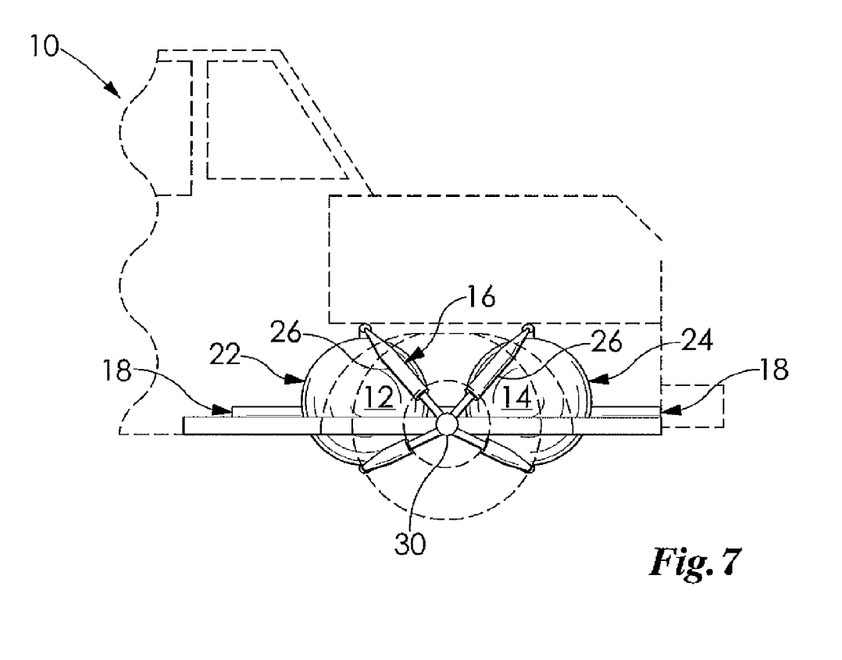
FIG. 7 is a side elevational view of the suspension system of FIG. 1 with the fuel storage system disposed on an undercarriage of a vehicle.

FIG. 6 shows a fuel storage system 610 according to another embodiment of the invention. The embodiment of FIG. 6 is similar to the fuel storage system 410 of FIG. 4 except as described below. Like the structure from FIG. 4, FIG. 6 includes reference numerals in the 600s instead of the 400s, with the remaining two digits the same.

In the embodiment shown, the support system 618 is a subframe including a plurality of spaced apart rails 636 and spaced apart cross rails 638. The support system 618 forms a part of the support frame of the vehicle. The support system 618 is coupled to the fuel tanks 612, 614. The rails 636 are disposed on an undercarriage of the vehicle parallel to the longitudinal axis of the vehicle, while the cross rails 638 are fixed to the rails 636 perpendicular to the longitudinal axis of the vehicle. The fuel tanks 612, 614 are coupled to the cross rails 638 by support rails 640 to provide cross-support to the support system 618. It is understood that the support rails 640 of the fuel tanks 612, 614 may be integrally formed with the cross rails 638 or separately attached to the cross rails 638, as desired. It is also understood that the support rails 640 of the fuel tanks 612, 614 may be integrally formed with the rails 636 or separately formed and attached to the rails 636, as desired.

In use, the fuel storage system 610 is coupled to the undercarriage of the vehicle by bolts or other attachment means disposed through apertures 619 formed in the support system 618. The fuel storage system 610 is separately assembled and attached to the vehicle. When the vehicle is driven, the control arms 626 of the suspension system 616 minimize the movement of the vehicle and passengers caused by road irregularities such as debris, potholes, and uneven roads, for example. The springs 627 and control arms 626 are adapted to dampen a sudden shock impulse and dissipate the kinetic generated as the vehicle is driven. Because the control arms 626 are coupled to the rails 636 of the support system 618, the support system 618 and the fuel tanks 612, 614 are load bearing members of the vehicle, and function as part of the support frame of the vehicle. The support system 618 and the fuel tanks 612, 614 cooperate to carry vehicle structural loads and the reaction loads of the suspension system 616.

Interference with the performance of the suspension system 616 by the fuel tanks 612, 614 is militated against because the fuel tanks 612, 614 are coupled to, and provide cross support for, the support system 618 which is coupled directly to the suspension system 616. The direct coupling minimizes a redundancy of support member components, suspension system 616 components. Further, by minimizing the combined space occupied by the suspension system 616, the support system 618, and the fuel storage system 610 the storage volume of the fuel tanks 612, 614 may be maximized. A further advantage of providing the fuel storage system 610 that minimizes the redundancy of suspension system 616 components is that the interior and cargo space of the vehicle typically removed to provide for large volumes of fuel storage in the fuel tanks 612, 614 is minimized. Accordingly, the utility and comfort of the vehicle are optimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel storage system for a vehicle comprising:
    a support system adapted to be coupled to an undercarriage of the vehicle, wherein said support system is a plurality of vehicle frame rails;
    a first fuel tank coupled to said support system; and
    a suspension system coupled to said support system, wherein said suspension system includes a plurality of leaf springs, and wherein said suspension system and said support system with said first fuel tank are configured to carry vehicle loads.

2. The storage system of claim 1, wherein said suspension system includes a plurality of control arms.

3. The storage system of claim 2, wherein each of the plurality of leaf springs is pivotally coupled to the vehicle frame rails.

4. The storage system of claim 3, wherein each of the plurality of leaf springs is pivotally coupled to at least one of the plurality of control arms.

5. The storage system of claim 2, wherein each of the plurality of control arms is coupled to the vehicle frame rails.

6. The storage system of claim 3, wherein each of the plurality of control arms is coupled to at least one of the plurality of leaf springs.

7. The storage system of claim 1, further including an axle coupled to said suspension system.

8. The storage tank of claim 1, further comprising a second fuel tank for storing a compressed fuel, said second fuel tank coupled to said support system.

9. A fuel storage system for a vehicle comprising:
    a support system adapted to be coupled to an undercarriage of the vehicle, wherein said support system is a plurality of vehicle frame rails;
    a plurality of fuel tanks coupled to said support system; and
    a suspension system coupled to said support system, wherein said suspension system includes a plurality of leaf springs, and wherein said suspension system and said support system with said fuel tanks are configured to carry vehicle loads.

10. The storage system of claim 9, wherein said suspension system includes a plurality of control arms.

11. The storage system of claim 10, wherein each of the plurality of leaf springs is pivotally coupled to the vehicle frame rails.

12. The storage system of claim 11, wherein each of the plurality of leaf springs is pivotally coupled to at least one of the plurality of control arms.

13. The storage system of claim 10, wherein each of the plurality of control arms is coupled to the vehicle frame rails.

14. The storage system of claim 11, wherein each of the plurality of control arms is coupled to at least one of the plurality of leaf springs.

15. The storage system of claim 9, wherein said fuel tanks are integrally formed with said support system.

16. A fuel storage system for a vehicle comprising:
    a support system adapted to be coupled to an undercarriage of the vehicle;
    a plurality of fuel tanks coupled to said support system; and
    a suspension system coupled to said support system including a plurality of leaf springs and a plurality of control arms, the plurality of leaf springs pivotally coupled to said support system and to the control arms, wherein said suspension system and said support system with said fuel tanks are configured to carry vehicle loads.

* * * * *